United States Patent [19]

Noutko et al.

[11] 4,360,848
[45] Nov. 23, 1982

[54] CAPACITOR PROTECTIVE DEVICE

[76] Inventors: Theodore E. Noutko, 10467 Lee Ann Ct., Brighton, Mich. 48116; Steve D. Toms, 2137 Webster Park; David P. Light, 8058 Hemingway, both of Howell, Mich. 48843

[21] Appl. No.: 160,685

[22] Filed: Jun. 18, 1980

[51] Int. Cl.³ .............................................. H02H 7/16
[52] U.S. Cl. .................................... 361/15; 361/272; 361/275
[58] Field of Search ..................... 361/15, 16, 17, 272, 361/275, 278, 306, 433; 174/52 S; 339/147 R

[56] References Cited

U.S. PATENT DOCUMENTS

| | | | |
|---|---|---|---|
| 1,920,177 | 8/1933 | Bailey | 361/272 X |
| 3,209,217 | 9/1965 | Innis et al. | 361/275 X |
| 3,235,778 | 2/1966 | Myers et al. | 361/275 |
| 3,248,617 | 4/1966 | Hynes et al. | 361/275 |
| 3,377,510 | 4/1968 | Rayno | 361/15 |
| 3,644,796 | 2/1972 | Carino | 361/433 |
| 3,815,073 | 6/1974 | Pollmeier et al. | 361/275 X |

FOREIGN PATENT DOCUMENTS

| | | | |
|---|---|---|---|
| 638288 | 3/1962 | Canada | 361/275 |
| 654832 | 12/1962 | Canada | 361/275 |
| 923920 | 4/1963 | United Kingdom | 361/275 |

*Primary Examiner*—Reinhard J. Eisenzopf
*Attorney, Agent, or Firm*—Gifford, VanOphem, Sheridan & Sprinkle

[57] ABSTRACT

A protective assembly is provided for a power capacitor having three electrical terminals extending outwardly from the top of the capacitor. The protective assembly comprises a mounting plate constructed of an electrical insulating material having three holes formed through it which register with the electrical terminals of the capacitor. The mounting plate is positioned over the capacitor terminals so that the lower side of the mounting plate faces the top of the capacitor while the electrical terminals protrude outwardly from the upper side of the mounting plate. Bleed resistors are connected between each pair of the capacitor terminals on the upper side of the plate. In addition, a fuse assembly is attached to the upper side of the mounting plate and has at least one and preferably three fuse holders. Each capacitor terminal is connected to one of the fuse holders on the fuse assembly while the other terminal for each fuse holder forms the power connection to the electrical load.

7 Claims, 3 Drawing Figures

CAPACITOR PROTECTIVE DEVICE

BACKGROUND OF THE INVENTION

I. Field of the Invention

The present invention relates generally to a protective assembly for capacitors and, more particularly, to a protective assembly for power capacitors.

II. Description of the Prior Art

In industrial applications, the industrial electrical load requires not only kilowatts (KW) or working current but also kilovars (KVAR) which are drawn by motors and other inductive electrical equipment which require magnetizing current. The kilovar requirement also increases proportionately with the inductive load.

In the well known fashion, the total apparent power requirement, measured in kilovolt-ampere (KVA) is the vector sum of the working and reactive power. Moreover, the power factor of the electrical apparatus represents the relationship between the working power and the reactive power. A power factor is equal to the working power divided by the reactive power and thus is equal to the cosine of the angle between the working power vector and the apparent power vector.

A low power factor caused by a high inductive electrical load is disadvantageous in that it results in poor electrical efficiency. Consequently, a low power factor results in power loss in the individual motor feeders and in step down transformers. A low power factor also increases the resistive heat losses in transformers and other electrical distribution equipment and also increases the difficulty in obtaining proper voltage stabilization. Perhaps more importantly, however, many electrical utility companies impose penalties on industrial users when which the power factor for the user falls below a prescribed amount. Consequently, low power factors can result in increased electrical utility bills.

In order to increase the power factor, it has been a previously known practice for industrial users to couple power capacitors in shunt with the inductive load since the capacitor reactance vector opposes the inductive reactance vector. Such power capacitors, furthermore, typically comprises an outer casing having three internal capacitors contained within it. Three capacitor terminals protrude upwardly from the top of the casing and one internal capacitor is electrically connected between each set of terminals. These terminals are then electrically connected with the user's inductive load to provide the necessary capacitive load to increase the power factor. These previously known power capacitors, however, have suffered from a number of disadvantages.

One disadvantage of the previously known power capacitors is that each internal capacitor within the power capacitor is thermally fused to its electrical terminal. Such thermal fuses, however, are prone to failure before the actual failure of the capacitor which results in expensive and unnecessary replacement of the entire power capacitor.

A still further disadvantage of these previously known power capacitors is that is is necessary to couple a bleed resistor across each pair of capacitor terminals to prevent the retention of excessive voltages within the capacitor once it is disconnected from the electrical apparatus. It has been the previous practice to directly connect a bleed resistor across the capacitor terminals for each of the capacitors. Consequently, the bleed resistors form a triangular or delta arrangement between the capacitor terminals on the top of the capacitor. In operation, however, such bleed resistors are known to break apart from the capacitor terminals or otherwise fail so that a portion of the failed bleed resistor physically contacts the power capacitor housing. When this occurs, the capacitor becomes shorted which destroys the power capacitor and also creates a safety hazard.

A still further disadvantage of the previously known power capacitors is that each capacitor terminal comprises a threaded shank onto which a nut is secured in order to form an electrical connection between both the bleed resistors and also the electrical leads from the power capacitor and to the inductive load. The nuts which are secured onto the capacitor terminals, however, must be accurately torqued within certain critical limits in order to ensure a good electrical connection to the capacitor terminals while simultaneously preventing damage and electrical shorts between the capacitor terminals. In practice, however, workman at the industrial plants where the power capacitors are used are both insufficiently skilled and do not have the proper tools to ensure the proper torque on the capacitor terminal nuts. As such, the improper installation of the previously known power capacitors has resulted both in premature failure of the power capacitors and also in improper operation of the power capacitors.

A still further disadvantage of the previously known power capacitors is that the electrical leads from the power capacitors, particularly when a plurality of power capacitors are utilized in a bank, must be wire wrapped together and fastened to the rack or housing in which the power capacitor are mounted. Such wire wrapping, however, is disadvantageous is that it is tedious and time consuming to perform.

SUMMARY OF THE PRESENT INVENTION

The present invention provides an improved protective assembly for a power capacitor of the type having a plurality of electrical terminals extending outwardly from one side of the capacitor.

In brief, the protective assembly of the present invention comprises a mounting plate constructed of an electrical insulating material and having a plurality of apertures formed through it which register with the capacitor terminals. The mounting plate is positioned over the capacitor terminals so that the lower side of the mounting plate faces the capacitor while a portion of the capacitor terminals protrude outwardly from the upper side of the mounting plate.

Bleed resistors are then connected between the capacitor terminals on the upper side of the mounting plate. Consequently, in the event of failure or breakage of the bleed resistors, the mounting plate prevents the bleed resistors from contacting the power capacitor housing and thus from damaging the power capacitor.

In addition, a fuse assembly is mounted to the upper side of the mounting plate in a generally spaced and parallel relationship. The fuse assembly further includes at least one and preferably three fuse holders into which a current limiting fuse can be removably positioned. One side of each fuse holder is electrically connected to one of the capacitor terminals while, similarly, the opposite side of each fuse holder is electrically connected to the user's inductive load.

The capacitor protective assembly according to the present invention is advantageous for a number of different reasons. A prime advantage of the protective assembly of the present invention is that the mounting plate supports the bleed resistors and prevents the bleed resistors from contacting the power capacitor housing in the event of failure or breakage of the bleed resistors. A still further advantage of the protective assembly of the present invention is that the entire protective assembly can be constructed and installed on a power capacitor prior to shipment. Thereafter, at the point of installation, the user needs only to connect the electrical lines from the load to the open sides of the fuse holders where the torque force apply is not critical. As such, the capacitor terminal nuts can be properly installed and torqued by the manufacturer where skilled workmen and the proper tools are readily available.

A still further advantage of the protective assembly according to the present invention, is that a channel is formed between the mounting plate and the fuse assembly. This channel can be used as a raceway for the electrical lines along the rack or housing in which the power capacitors are mounted. This raceway minimizes or even eliminates the necessity of completely wire wrapping the power leads extending from the fuse assemblies and to the point of connection to the electrical load.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
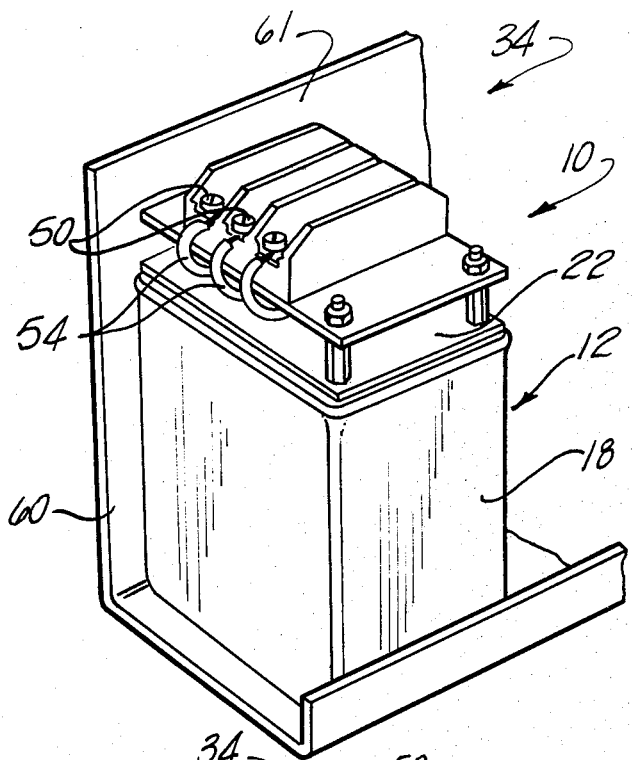
FIG. 1 is a perspective view illustrating a preferred embodiment of the protective assembly of the present invention mounted to a power capacitor and positioned in a mounting rack.
Figure 2:
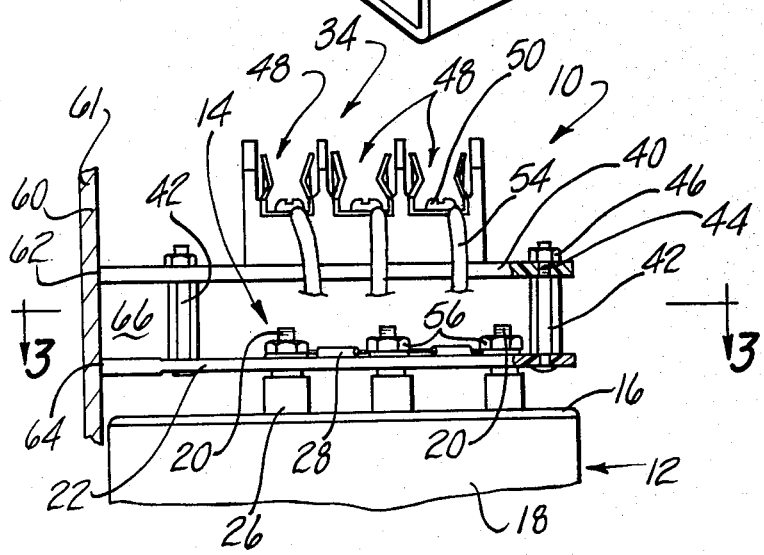
FIG. 2 is a partial fragmentary side view illustrating a preferred embodiment of the protective assembly of the present invention and with parts removed for clarity.

With reference first to FIGS. 1 and 2, a preferred embodiment 10 of the protective assembly according to the present invention is thereshown mounted on a power capacitor 12 having a housing 18 in a fashion to be subsequently described in greater detail. The power capacitor 12, in the conventional fashion, includes three capacitor terminals 14 which extend outwardly from the top 16 of the power capacitor housing 18. Moreover, these capacitor terminals 14 are arranged in a triangular pattern (FIG. 3) and each capacitor terminal 14 has an insulating post 26 and a threaded shank 20 at its uppermost or free end.

Figure 3:
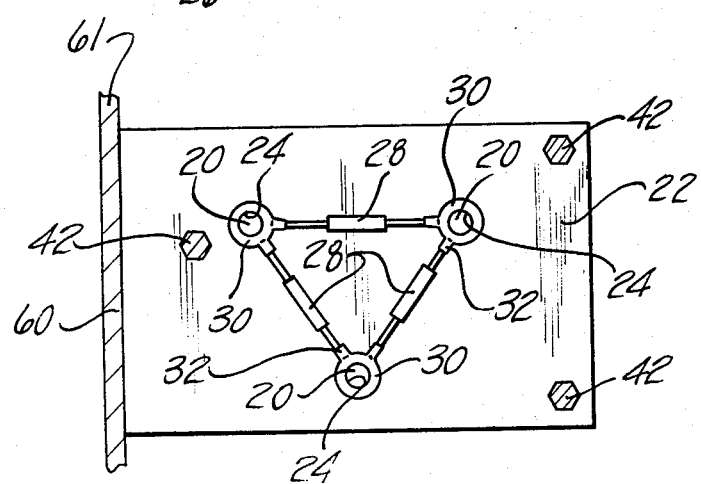
FIG. 3 is a sectional view taken substantially along line 3—3 in FIG. 2.

Referring to FIGS. 1–3, the protective assembly 10 further comprises a planar mounting plate 22 which is rectangular in shape (FIG. 3) and is constructed of an electrical insulating material. The mounting plate 22, furthermore, has three apertures 24 formed through it which register with the shanks 20 of the capacitor terminals 14 so that the mounting plate 22 can be positioned on top of the power capacitor 14. In doing so, the shank 20 of each capacitor terminals 14 protrudes upwardly from the upper side of the mounting plate 22 as is best shown in FIG. 2. Moreover, the lower side of the mounting plate 22 is supported by insulating posts 26 of the capacitor terminals 14.

Referring now particularly to FIGS. 2 and 3, a bleed resistor 28 is connected between each pair of capacitor terminals 14. Although any means can be used to connect the bleed resistor 28 between the capacitor terminals 14, as is best shown in FIG. 3, a terminal connector 30 is disposed over each terminal shank 20 and has two legs 32 to which the bleed resistors 28 are connected. In the conventional fashion, the bleed resistors 28 prevent the retention of high voltages within the power capacitor 12 after the capacitor has been disconnected from its load.

With reference now particularly to FIGS. 1 and 2, the protective assembly of the present invention further comprises a fuse assembly 34 which is attached to the mounting plate 22 in a fashion to be shortly described. The fuse assembly 34 comprises a fuse holder plate 40 which is constructed of an electrical insulating material. The plate 40 is substantially the same size as the mounting plate 22 and is attached to the mounting plate 22 by three spacers 42 so that the fuse holder plate 40 is spaced upwardly from and is substantially parallel to the mounting plate 22. Furthermore, each spacer 42 has a threaded shank 44 which protrudes upwardly through an aperture in the plate 40 and nuts 46 threadably engage the shanks 44 to detachably secure the plates 22 and 40 together.

Still referring to FIGS. 1 and 2, at least one and preferably three fuse holders 48 are mounted the upper side 50 of the plate 40. Each fuse holder 48 includes an incoming electrical terminal 50 and an outgoing electrical terminal 52 (FIG. 1). The incoming electrical fuse holder terminals 50 are electrically connected by wires 54 to each capacitor terminal shank 20 so that each capacitor terminal 14 is electrically fused by a fuse in the fuse holder assembly 34.

With electrical wires 54 and the bleed resistors 28 properly positioned around the capacitor terminal shank 20, the wires 54 and bleed resistors 28 are connected to their respective capacitor terminals by capacitor terminal nuts 56 as is best shown in FIG. 2. Thus, the protective assembly of the present invention can be completely installed on the power capacitor 12 at the place of manufacture and then shipped to the ultimate user. The ultimate user, moreover, need only connect the electrical apparatus (not shown) to the fuse holder terminals 52 where the actual torque force applied to the terminal 52 is not critical.

In operation, the power capacitor 12 with the protective assembly is mounted within a housing or rack 60 so that an edge 62 of the upper plate 40 and the corresponding edge 64 of the mounting plate 22 abuts against a wall 61 of rack 60 as best shown in FIG. 2. In doing so, a channel or raceway 66 is formed through which electrical wires (not shown) can be routed without the necessity of wire wrapping these electrical wires. This is particularly advantageous when a plurality of power capacitors 12, each having their own protective assembly 10, are mounted side by side and within the same rack 60.

From the foregoing, it can be seen that the protective assembly according to the present invention is advantageous in a number of different respects. First, the power capacitor 12 with the protective assembly 10 can be manufactured and shipped as a complete functional capacitor unit in which the power capacitor 12 is protected by the bleed resistor 28 and replacable fuses mounted within the fuse holders 48. Moreover, the capacitor terminal nuts 56 can be completed installed at the place of manufacture where both skilled workman and the appropriate tools are available for torquing the capacitor terminal nuts 56 to their proper torque value. The only connection required at the place of installation is to connect the fuse terminals 52 to the load or electrical apparatus and the actual torquing of the fuse terminals 52 is not critical.

A still further advantage of the protective assembly 10 of the present invention is that the bleed resistors 28 are positioned on the upper surface of the mounting plate 22. Thus, in the event of failure or disconnection of the bleed resistor 28 from the capacitor terminal 14, the mounting plate 22 prevents the disconnected resistors 28 from contacting the power capacitor housing 18 which can otherwise result in the destruction of the power capacitor.

During the operation of the power capacitor 12, the power capacitor 12 normally generates a relatively large quantity of heat. The mounting plate 22, however, serves as heat sheild to protect both the bleed resistors 28 and the fuses in the fuse assembly 34 from thermal damage and the resultant thermal failure.

In addition, the upper plate 40 not only provides a mounting surface for the fuse holders 48 but also provides mechanical protection for the bleed resistors 28 and the capacitors 14. The upper plate 40 also increases the degree of difficulty in making physical contact with the capacitor terminals 14 and thus provides an additional safety factor.

A still further advantage of the protective device according to the present invention is that the channel 66 formed between the plates 40 and 22 provides a raceway for the wiring between the fuse terminals 52 and the electrical apparatus or load. This wiring raceway is particularly advantageous when a plurality of power capacitors are mounted side by side in a bank.

A still further advantage of the protective device of the present invention is that the power capacitor 12 must be physically viewed when replacing fuses within the fuse holders 48. Consequently, bulging or other deterioration of the power capacitor 12, a normal occurrence when the power capacitor enters its failure mode, can be easily seen and detected by the workman. The power capacitor can then be replaced prior to its actual failure.

Furthermore, it has been found the power capacitor 12 need not be internally fused as has been the prior practice. Instead, the replacable and inexpensive fuse in the fuse holders 48 are replaced as required which prevents premature replacement of the power capacitor due to failure of an internal fuse.

Having described our invention, however, many modifications thereto will become apparent to those skilled in the art to which it pertains without deviation of the spirit of the invention as defined by the scope of the appended claims.

We claim:

1. A protective assembly for a capacitor of the type having a plurality of electrical terminals extending outwardly from one side of the capacitor in which said electrical terminals are adapted for detachable electrical connection with an electrical circuit, said protective assembly comprising:

a mounting plate constructed of an electrical insulating material, said mounting plate having a plurality of apertures formed through it which register with said electrical terminals, said mounting plate to be positioned on said one side of said capacitor so that said terminals extend through said mounting plate apertures whereupon one side of said plate faces said one side of the capacitor while said terminals protrude outwardly from the other side of the plate, means for detachably securing said mounting plate to the capacitor terminals, a further plate and means for securing said further plate to said mounting plate so that said further plate is substantially parallel to and spaced outwardly from said other side of the mounting plate, a fuse assembly secured to said further plate, said fuse assembly comprising at least one fuse holder having at least two electrical fuse terminals, and means for electrically connecting at least one fuse terminal to at least one capacitor terminal.

2. The invention as defined in claim 1 and further comprising at least one resistor extending between two capacitor terminals, said resistor being positioned between said mounting plate and said further plate.

3. The invention as defined in claim 2 wherein said mounting plate is constructed of a thermal insulating material so that said mounting plate forms a heat shield between said capacitor and said at least one resistor.

4. The invention as defined in claim 1 wherein said capacitor has three terminals, said fuse assembly further comprising three fuse holders, each fuse holder having two electrical terminals, and wherein said electrical connecting means further comprises means for wiring each fuse holder in series with one of said capacitor terminals.

5. The invention as defined in claim 1 wherein said capacitor has three terminals and further comprising three resistors positioned between said mounting plate and said further plate, one of said resistors being electrically connected between each pair of capacitor terminals.

6. The invention as defined in claim 1 wherein said further plate is constructed of an electrical insulating material and wherein said means for securing said further plate to said mounting plate further comprises at least two spacers extending between said mounting plate and said further plate, at least one spacer being spaced inwardly from the outer periphery of the further plate and of the mounting plate thereby forming a wire guide channel therebetween.

7. The invention as defined in claim 1 wherein said further plate is detachably secured to said mounting plate.

* * * * *